United States Patent
Ito et al.

(10) Patent No.: US 6,360,958 B1
(45) Date of Patent: Mar. 26, 2002

(54) VEHICLE AIR CONDITIONING APPARATUS WITH HOT WATER FLOW CONTROL

(75) Inventors: Koichi Ito; Kenji Suwa, both of Kariya; Noriyoshi Miyajima, Nukata-gun, all of (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/405,732

(22) Filed: Sep. 24, 1999

(30) Foreign Application Priority Data

Oct. 5, 1998 (JP) .......................................... 10-282799
Aug. 5, 1999 (JP) .......................................... 11-222682

(51) Int. Cl.[7] .............................. B60H 1/02; B60H 1/06; B60H 3/00
(52) U.S. Cl. ............. 237/2 A; 237/12.3 A; 237/12.3 B; 236/78 C; 236/78 D; 236/91 F; 165/271; 165/42; 165/43
(58) Field of Search ............................ 165/204, 42, 43, 165/201, 202, 271; 237/12.3 B, 2 A, 12.3 A; 236/78 C, 78 D, 91 F

(56) References Cited

U.S. PATENT DOCUMENTS

| | | | | | |
|---|---|---|---|---|---|
| 4,949,779 | A | * | 8/1990 | Kenny et al. .................. | 165/43 |
| 4,974,664 | A | * | 12/1990 | Glennon et al. ............... | 165/43 |
| 5,085,267 | A | * | 2/1992 | Torrence ....................... | 165/43 |
| 5,127,576 | A | * | 7/1992 | Weatherhead et al. ........ | 165/43 |
| 5,184,773 | A | * | 2/1993 | Everingham ........... | 237/12.3 B |
| 5,226,595 | A | * | 7/1993 | Devera et al. ................. | 165/43 |
| 5,273,105 | A | * | 12/1993 | Higashihara et al. .. | 237/12.3 B |
| 5,730,089 | A | * | 3/1998 | Morikawa et al. ..... | 237/12.3 B |
| 5,957,377 | A | * | 9/1999 | Inoue et al. ........... | 237/12.3 B |
| 5,975,421 | A | * | 11/1999 | Ito et al. ................ | 237/12.3 B |
| 6,109,534 | A | * | 8/2000 | Ito et al. ................ | 237/12.3 B |
| 6,131,652 | A | * | 10/2000 | Ito et al. ...................... | 165/204 |

FOREIGN PATENT DOCUMENTS

JP        A-11-42921        2/1999

* cited by examiner

*Primary Examiner*—John K. Ford
(74) *Attorney, Agent, or Firm*—Harness, Dickey & Pierce, PLC

(57) ABSTRACT

In an air conditioning apparatus for a vehicle, an amount of hot water flowing from an engine into a heater core is adjusted by a flow control valve so that temperature of air blown from the heater core is adjusted. A water pump driven by the engine is disposed in a water circuit so that hot water circulates between the engine and the heater core. The flow control valve includes a bypass passage through which hot water bypasses the heater core and a pressure response valve for adjusting an opening degree of the bypass passage. An opening degree of the flow control valve is controlled by a control unit so that the amount of hot water flowing into the heater core is adjusted. In the air conditioning apparatus, the opening degree of the flow control valve is corrected by the control unit to reduce variation in the amount of hot water flowing into the heater core due to variation in a rotation speed of the engine. Thus, variation in temperature of air blown from the heater core due to the variation in the rotation speed of the engine can be reduced.

2 Claims, 10 Drawing Sheets

VEHICLE AIR CONDITIONING APPARATUS WITH HOT WATER FLOW CONTROL

CROSS-REFERENCE TO RELATED APPLICATION

This application is related to and claims priority from Japanese Patent Applications No. Hei. 10-282799 filed on Oct. 5, 1998 and No. Hei. 11-222682 filed on Aug. 5, 1999, the contents of which are hereby incorporated by reference.

BACKGROUND OF THE INVENTION

1. Field of the Invention

The present invention relates to an air conditioning apparatus which adjusts temperature of air blown into a passenger compartment by adjusting an amount of hot water flowing into a heating heat exchanger, while restricting a variation in temperature of blown-air due to a variation in a rotation speed of an engine. The air conditioning apparatus is suitable for a one-box type recreational vehicle (RV), for example.

2. Description of Related Art:

In a vehicle air conditioning apparatus having a rear air-conditioning unit for controlling temperature of air blown toward a rear seat side of a passenger compartment, temperature of air blown into the passenger compartment is controlled by a flow control valve for adjusting an amount of hot water flowing into a heating heat exchanger so that a size of the rear air-conditioning unit is reduced. In the air conditioning apparatus, a water pump driven by an engine of the vehicle is disposed in a water circuit of the engine, and hot water heated by the engine is supplied into the heating heat exchanger by the water pump. Therefore, when a rotation speed of the engine is increased, the amount of hot water flowing into the heating heat exchanger is increased so that the temperature of air blown into the passenger compartment is also increased, even when an opening degree of the flow control valve is set to be equal.

SUMMARY OF THE INVENTION

In view of the foregoing problems, it is an object of the present invention to provide an air conditioning apparatus for a vehicle, which can decrease a variation in temperature of air from a heating heat exchanger, due to a variation in a rotation speed of an engine.

According to the present invention, an air conditioning apparatus includes a heating heat exchanger for heating air by performing heat exchange between water in a water circuit and air passing therethrough, and a flow control valve which adjusts a flow amount of water flowing into the heating heat exchanger to adjust temperature of air blown from the heating heat exchanger. The flow control valve includes a water bypass passage through which water bypasses the heating heat exchanger, and a pressure-response valve for adjusting an opening degree of the water bypass passage in accordance with pressure of water supplied from the engine by a water pump which is driven by the engine. In the air conditioning apparatus, an opening degree of the flow control valve is controlled by a control unit to become a target opening degree so that the flow amount of water flowing into the heating heat exchanger is controlled, and the target opening degree of the flow control valve is corrected by a control unit in a direction for reducing variation in the flow amount of water flowing into the heating heat exchanger due to variation in a rotation speed of the engine. Thus, variation in temperature of air blown from the heating heat exchanger due to the variation in the rotation speed of the engine can be reduced, and air-conditioning feeling for a passenger in a passenger compartment of the vehicle can be improved.

Preferably, the control unit corrects the target opening degree of the flow control valve to absorb the variation in the flow amount of water flowing into the heating heat exchanger due to the variation in the rotation speed of the engine, when the target opening degree of the flow control valve is larger than a predetermined degree. Therefore, even when an adjustment of water passing through the water bypass passage due to the pressure-response valve is insufficient when the flow control valve is opened with a high opening degree, the variation in the amount of water flowing into the heating heat exchanger can be sufficiently adsorbed by correcting the target opening degree.

More preferably, the control unit corrects the target opening degree of the flow control valve to increase the target opening degree of the flow control valve by a predetermined degree from a set target value when the rotation speed of the engine is lower than a first predetermined value approximately corresponding to a rotation speed during an engine-idling, and the control unit further corrects the target opening degree so that the target opening degree is reset to the set target value when the rotation speed of the engine is increased to be higher than the first predetermined value. Therefore, even when the engine is operated with a rotation speed approximately corresponding to the rotation speed during the engine idling, it can effectively prevent temperature of air blown from the heating heat exchanger from being decreased.

On the other hand, the control unit corrects the target opening degree of the flow control valve to decrease the target opening degree of the flow control valve by a predetermined degree from a set target value when the rotation speed of the engine is increased to be higher than a second predetermined value which is greatly larger than the first predetermined value, and the control unit further corrects the target opening degree so that the target opening degree is reset to the set target value when the rotation speed of the engine is decreased to be lower than the second predetermined value. Therefore, it can effectively prevent temperature of air blown from the heating heat exchanger from being extremely increased due to an increased water amount when the engine is operated with a high rotation speed.

BRIEF DESCRIPTION OF THE DRAWINGS

Additional objects and advantages of the present invention will be more readily apparent from the following detailed description of preferred embodiments when taken together with the accompanying drawings, in which.

DETAILED DESCRIPTION OF THE PRESENTLY PREFERRED EMBODIMENTS

The preferred embodiments of the present invention will be described hereinafter with reference to the accompanying drawings.

Figure 1:
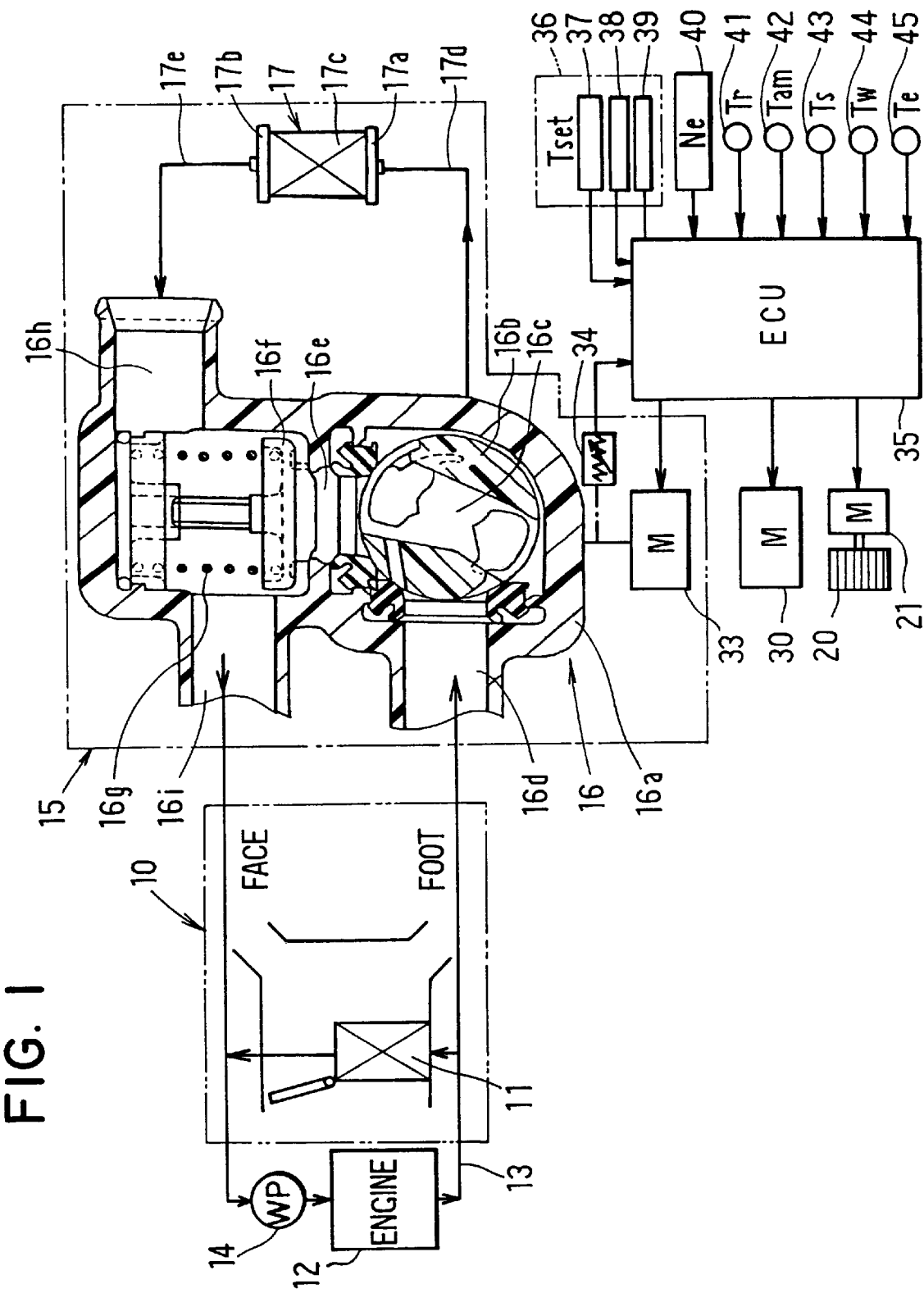
FIG. 1 is a schematic view showing an entire construction of a vehicle air conditioning apparatus according to a first preferred embodiment of the present invention.

A first preferred embodiment of the present invention will be now described with reference to FIGS. 1–12. In the first embodiment, the present invention is typically applied to a one-box recreational vehicle (RV). As shown in FIG. 1, an air conditioning apparatus includes a front air-conditioning unit 10 for adjusting temperature of air blown toward a front seat side in a passenger compartment, a rear-air conditioning unit 15 for adjusting temperature of air blown toward a rear seat in the passenger compartment, and a control unit 35 (ECU).

The front air-conditioning unit 10 is disposed within an instrument panel on a most front side of the passenger compartment. The front air-conditioning unit 10 includes a heater core 11 (i.e., heating heat exchanger): which heats air by using hot water (engine-cooling water) flowing from an engine 12 as a heating source. A water pump 14 driven by the engine 12 is disposed in a water circuit 13 so that hot water heated by heat generated from the engine 12 is circulated in the water circuit 13 by the water pump 14. The front air-conditioning unit 10 further includes a blower unit for blowing air toward the heater core 11, an evaporator (cooling heat exchanger) of a refrigerant cycle for cooling air, and the like. The blower unit and the evaporator are disposed on an upstream air side of the heater core 11.

The rear air-conditioning unit 15 is disposed on the rear seat side (e.g., the second or third seat side from the front seat) of the passenger compartment, so that the temperature of air blown toward the rear seat side in the passenger compartment can be adjusted. As shown in FIG. 1, in the rear air-conditioning unit 15, there are provided with a heater core 17 (heating heat exchanger) for heating air by using hot water circulating in the water circuit 13 as a heating source, and a flow control valve 16 for adjusting an amount of hot water flowing into the heater core 17.

Figure 2:
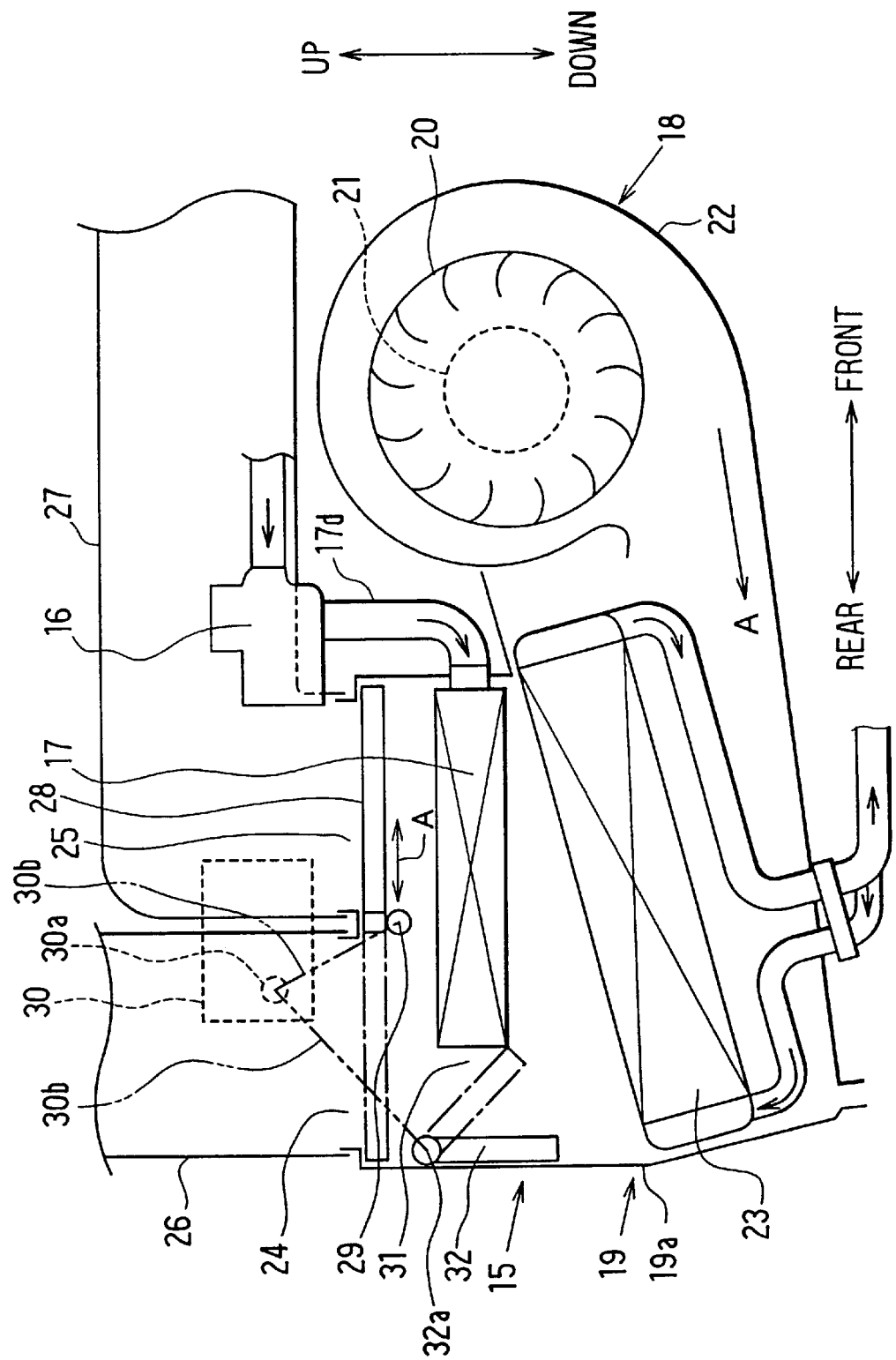
FIG. 2 is a schematic vertical sectional view showing a rear air-conditioning unit according to the first embodiment.

Further, as shown in FIG. 2, the rear air-conditioning unit 15 includes a blower unit 18 for blowing air and a heat-exchanging unit 19 in which a cooler portion and a heater portion are integrated. In the first embodiment, the blower unit 18 is disposed at a front side of-the vehicle, and the heat-exchanging unit 19 is disposed at a rear side of the blower unit 18 in a vehicle front-rear direction.

The blower unit 18 includes a centrifugal fan (e.g., sirocco fan) 20, a blower motor 21 for driving the fan 20, and a scroll casing 22 for accommodating the centrifugal fan 20. The centrifugal fan 20 sucks air from two air suction ports formed at both sides in an axial direction of the centrifugal fan 20, and air sucked from the air suction ports is blown toward the heat-exchanging unit 19 as shown by arrow A in FIG. 2.

The heat-exchanging unit 19 of the rear air-conditioning unit 15 is disposed in a case 19a at a downstream air side of the blower unit 18. The heat-exchanging unit 19 includes a rear evaporator 23 branched from the refrigerant cycle of the front air-conditioning unit 10. The evaporator 23 is disposed approximately horizontally in the case 19a on a lower side of the vehicle so that air blown by the blower unit 18 is introduced into a lower space of the evaporator 23, as shown in FIG. 2. In the refrigerant cycle, the evaporator 23 is connected to the front evaporator (not shown) of the front air-conditioning unit 10 in parallel. The refrigerant cycle includes a compressor driven by the engine 12, a condenser for condensing refrigerant, a receiver for separating refrigerant into liquid refrigerant and gas refrigerant, a front pressure reducing unit, a rear pressure reducing unit, the front evaporator and the rear evaporator 23. Refrigerant flowing through the evaporator 23 is evaporated by absorbing heat from air passing therethrough.

The evaporator 23 is formed approximately into a rectangular, and is thin in an up-down direction of the vehicle. In the first embodiment, for readily discharging condensed water generated from the evaporator 23, the evaporator 23 is slightly inclined from a horizontal direction by a small angle. That is, a downstream air end of the evaporator 23 is inclined toward a low side of the vehicle.

The heater core 17 is disposed approximately horizontally on the upper side of the evaporator 23, at a downstream air side of the evaporator 23. As shown in FIG. 1, the heater core 17 includes an inlet tank 17a and an outlet tank 17b disposed to form a predetermined distance therebetween, and a core portion 17c disposed between the inlet tank 17a and the outlet tank 17b. The core portion 17c has plural flat tubes disposed in parallel with each other, and plural corrugated fins each of which is disposed between adjacent flat tubes. In the heater core 17, hot water from the inlet tank 17a flows in one way toward the outlet tank 17b through the whole flat tubes.

The flow control valve 16 is disposed outside the case 19a on an oblique upper side of the heater core 17, adjacent to the heater core 17. A hot water inlet pipe 17d connected to the inlet tank 17a and a hot water outlet pipe 17e connected to the outlet tank 17b are respectively connected to the flow control valve 16, as shown in FIG. 1. The flow control valve 16 adjusts the amount of hot water flowing into the heater core 17 to control an air-heating amount in the heater core 17, so that the temperature of air blown into the passenger compartment is adjusted.

As shown in FIG. 1, hot water from the engine 12 is supplied to the heater core 17 through the flow control valve 16 by the water pump 14. The flow control valve 16 includes a case 16a made of resin, and a cylindrical valve body (i.e., rotor) 16b rotatably held in the case 16a. A control passage 16c for controlling a flow rate of hot water is formed in the valve body 16b. The control passage 16c is throttled in two steps at a hot water inlet side and a hot water outlet side thereof. Each throttle amount at the hot water inlet side and the hot water outlet side of the control passage 16c is adjusted by the rotation amount of the valve body 16b to control the flow rate of hot water. A first hot water inlet 16d for introducing hot water from the engine 12 is formed in the case 16a, and hot water introduced from the hot water inlet 16d is supplied to the heater core 17 from a hot water outlet (not shown) connected to the hot water inlet pipe 17d, through the control passage 16c.

Further, a bypass passage 16e is formed within the case 16a, and hot water from a position between two step throttles of the control passage 16c of the valve body 16b flows through the bypass passage 16e to bypass the heater core 17. A pressure-response valve (i.e., bypass valve) 16f is disposed in the bypass passage 16e. The pressure-response valve 16f increase an opening area (i.e., opening degree) of the bypass passage 16e according to a pressure increase of hot water supplied from the engine 12. A spring force of a coil spring 16g is applied to the pressure-response valve 16f in a direction for closing the pressure-response valve 16f. A second hot water inlet 16h through which hot water having passed through the heater core 17 is introduced into the flow control valve 16 from the hot water outlet pipe 17e is formed in the case 16a. Hot water having passed through the heater core 17 and hot water flowing through the bypass passage 16e are joined at a downstream side of the pressure-response valve 16f, and the joined hot water returns to the engine 12 from a hot water outlet 16i formed in the case 16a.

According to the flow control valve 16 shown in FIG. 1, each throttle amount of the two-step throttles of the control passage 16c is adjusted by the rotation amount of the valve body 16b to adjust the flow rate of hot water flowing into the heater core 17, and the pressure-response valve 16 suppresses the variation in flow rate of hot water supplying to the heater core 17 due to the variation in an engine rotational speed. Therefore, variation in the temperature of air blown from the heater core 17 can be suppressed, and the temperature of air blown from the rear air-conditioning unit 15 can be accurately controlled.

As shown in FIG. 2, on an upper portion of the heater core 17 in the case 19a, there are formed a face opening portion 24 for blowing air toward the head portion of a passenger seated on the rear seat in the passenger compartment, and a foot opening portion 25 for blowing air toward the foot portion of the passenger seated on the rear seat in the passenger compartment. The face opening portion 24 and the foot opening portion 25 are provided at an upper side (a downstream air side) of the heater core 17 to be opposite to the heater core 17. As shown in FIG. 2, the face opening portion 24 and the foot opening portion 25 are provided horizontally adjacent to each other in the front-rear direction of the vehicle. Thus, the face opening portion 24 and the foot opening portion 25 can be provided within the dimension range of the evaporator 23 and the heater core 17 in the width direction of the vehicle.

On end of a face duct 26 is connected to the face opening portion 24, and the other end of the face duct 26 extends upwardly to a ceiling portion of the vehicle. A ceiling duct extending in a width direction of the vehicle is formed in the ceiling portion, and plural face air outlets for blowing air toward the head portion of the passenger seated on the rear seat in the passenger compartment are formed in the ceiling duct.

Further, one end of a foot duct is connected to the foot opening portion 25, and the other end thereof is connected to a floor duct disposed on a floor board (not shown) of the vehicle to protrude from the floor board. Plural foot air outlets for blowing air toward the foot portion of the passenger seated on the rear seat in the passenger compartment are formed in the floor duct.

A mode switching door 28 for opening and closing the face opening portion 24 and the foot opening portion 25 is disposed at an upstream air side (lower side) of the face and foot opening portions 24, 25. The mode switching door 28 slides between the solid line position and the chain line position in FIG. 1 along the opening surfaces of the face and foot opening portions 24, 25. That is, the mode switching door 28 reciprocates along the horizontal direction to open and close the face and foot opening portions 24, 25.

A rack (not shown) is provided on a lower surface of the mode switching door 28, and a connection gear 29 engaged with the rack is connected to an output shaft 30a of an electrical driving unit 30 including a servomotor, through a link unit 30b (i.e., link mechanism) and the like. Therefore, the mode switching door 28 is moved by rotation force of the electrical driving unit 30 between the solid line position and the chain line position in FIG. 2 along the opening surfaces of the face and foot opening portions 24, 25.

Further, a cool air bypass passage 31 through which cool air bypasses the heater core 17 is provided in the case 19a at a side position of the heater core 17 to be proximate to the face opening portion 34, and a cool air bypass door 32 is disposed in the case 19a to open and close the cool air it bypass passage 31. The cool air bypass door 32 is a plate-like door rotating around a rotation shaft 32a between the solid line position and the chain line position in FIG. 2. The rotation shaft 32a of the cool air bypass door 32 is connected to the output shaft 30a of the electrical driving unit 30 through the link unit 30b and the like. Thus, both the cool air bypass door 32 and the mode switching door 28 are driven by the single electrical driving unit 30 to be operatively linked from each other.

Next, the control of the flow control valve 16 will be now described. The valve body 16b of the flow control valve 16 has a rotation shaft (not shown) extending in a face-back direction in FIG. 1. The rotation shaft of the valve body 16b protrudes to an outside of the case 16a, and a protrusion portion of the rotation shaft of the valve body 16b is connected to an output shaft of an electrical driving unit 33. A rotation position sensor 34 for detecting a rotation position of the valve body 16b is connected to the rotation shaft of the valve body 16b of the flow control valve 16, and the detected rotation position signal is input into the control device 35.

A rear control panel 36 is disposed on the rear seat side in the passenger compartment, and is provided with a rear temperature setting unit 37, a rear air outlet mode setting unit 38 and a rear air amount setting unit 39 which are manually operated by a passenger on the rear seat of the passenger compartment. Temperature (Tset) on the rear seat side within the passenger compartment is set by the temperature setting unit 37. Further, signals from the temperature setting unit 37, the air outlet mode setting unit 38, and the air amount setting unit 39 are input into the control unit 35. On the other hand, detected signals from a sensor group are also input into the control unit 35. The sensor group includes an engine rotation speed sensor Ne for detecting the rotation number Ne of the engine 12, an inside air temperature sensor 41 for detecting temperature Tr of inside air (i.e., air inside the passenger compartment), an outside air temperature sensor 42 for detecting temperature Tam of outside air (i.e., air outside the passenger compartment), a sunlight sensor 43 for detecting a sunlight amount Ts entering the passenger compartment, a water temperature sensor 44 for detecting temperature Tw of hot water flowing into the heater core 17, and an evaporator temperature sensor 45 for detecting temperature Te of air blown out from the evaporator 23.

In the first embodiment of the present invention, the control unit 35 is an electronic control unit (ECU) composed of a microcomputer and circuits around the microcomputer. For example, the control unit 35 controls operation of components such as the electrical driving devices 30, 33 and the blower motor 21.

Next, operation of the air conditioning apparatus according to the first embodiment of the present invention will be now described.

Here the operation of the rear air conditioning unit 15 will be mainly described. When the centrifugal fan 20 operates, inside air of a rear seat side space of the passenger compartment is sucked into the scroll casing 22, and is blown toward the heat-exchanging unit 19. In the heat-exchanging unit 19, air blown by the blower unit 18 passes through the evaporator 23 to be cooled, and then passes through the heater core 17 on the upper side of the evaporator 23 to be heated. The amount of hot water flowing into the heater core 17 is continuously adjusted by adjusting the opening degree of the two step throttles of the control passage 16c, so that the temperature of air blown into the passenger compartment is adjusted. Further, the opening degree of the control passage 16c is adjusted by the rotation position of the valve body 16b of the flow control valve 16.

The face opening portion 24 and the foot opening portion 25 are opened and closed by the reciprocate sliding movement of the mode switching door 28. When the mode switching door 28 is operated to the solid line position in FIG. 2, the face opening portion 24 is opened and the foot opening portion 25 is closed, so that a rear face mode is set in the rear air-conditioning unit 15. During the rear face mode, air is only blown into the passenger compartment from the face air outlets through the face opening portion 24 and the face duct 26.

When the mode switching door 28 is moved to the solid line position in FIG. 2 during the rear face mode, the cool air bypass door 32 is operated together with the movement of the mode switching door 28 to open the cool air bypass passage 31. Therefore, air flow resistance (pressure loss) within the case 19a can be reduced during the face mode. Thus, when maximum cooling operation is set during the face mode, the air amount blown into the passenger compartment can be increased, and cooling capacity for the passenger compartment can be improved.

When the mode switching door 28 is operated to the chain line position in FIG. 2 to open the foot opening portion 25 and to close the face opening portion, a rear foot mode is set. During the rear foot mode, conditioned air is blown into the passenger compartment from the foot air outlets on the floor board through the foot opening portion 25 and the foot duct 27.

When the mode switching door 28 is operated to an approximate middle position between the solid line position and the chain line position in FIG. 2 to open both the face and foot opening portions 24, 25, a rear bi-level mode is set. During the rear bi-level mode, conditioned air is simultaneously blown from the face and foot air outlets through the face and foot opening portions 24, 25 and the face and foot air ducts 26, 27, respectively.

When the rear foot mode is set in the winter, temperature of air blown into the passenger compartment is increased by the operation of the rear air-conditioning unit 15, so that heating operation for heating the passenger compartment is performed. Therefore, the valve body 16b of the flow control valve 16 is operated with a large opening degree, a pressure difference between both sides of the pressure-response valve 16f is reduced, and the flow amount of hot water bypassing the heater core 17 through the pressure response valve 16f becomes smaller. As a result, when the rotation speed (i.e., rotation number) of the engine 12 is changed in a wide range from the engine-idling rotation speed of 650 rpm to a high rotation speed of 6000 rpm, the variation in the amount of hot water flowing into the heater core 17 due to the variation in the engine rotation speed cannot be sufficiently restricted by adjusting the flow amount of hot water bypassing the heater core 17, and the temperature of air blown into the passenger compartment is greatly changed with the variation in the engine rotation speed.

Figure 3:
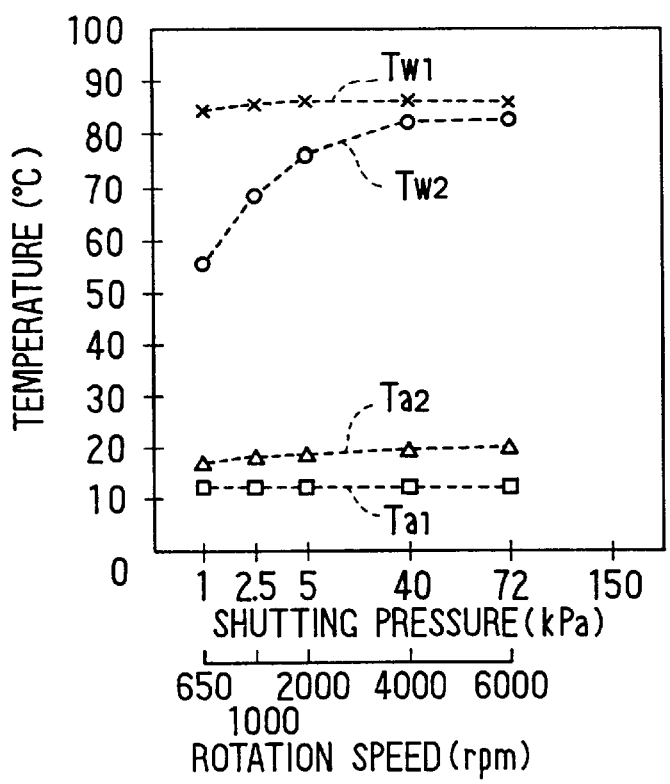
FIG. 3 is a graph for explaining the relationship between an engine rotation speed and a variation in temperature of blown-air, when an opening degree of a flow control valve is 30°, according to the first embodiment.
Figure 4:
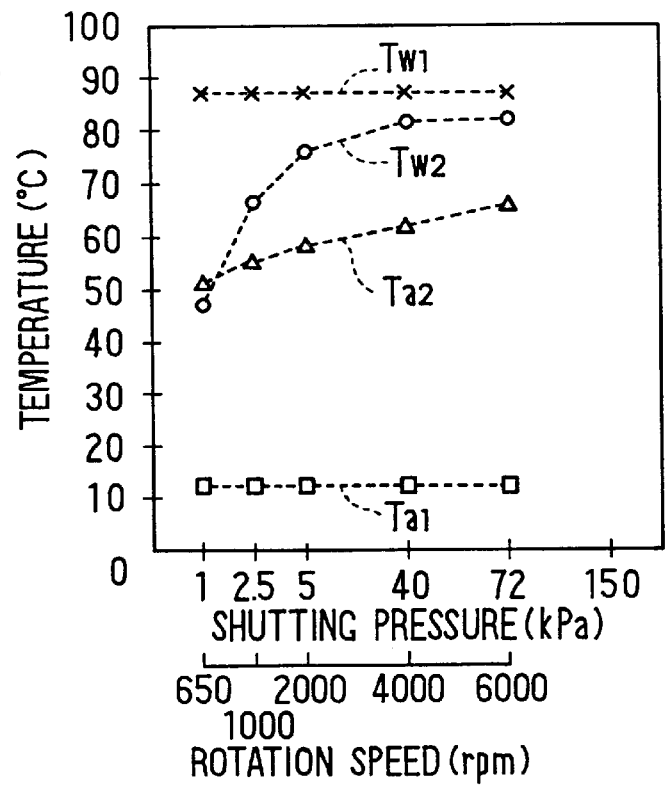
FIG. 4 is a graph for explaining the relationship between the engine rotation speed and the variation in temperature of blown-air, when the opening degree of the flow control valve is 80°, according to the first embodiment.
Figure 5:
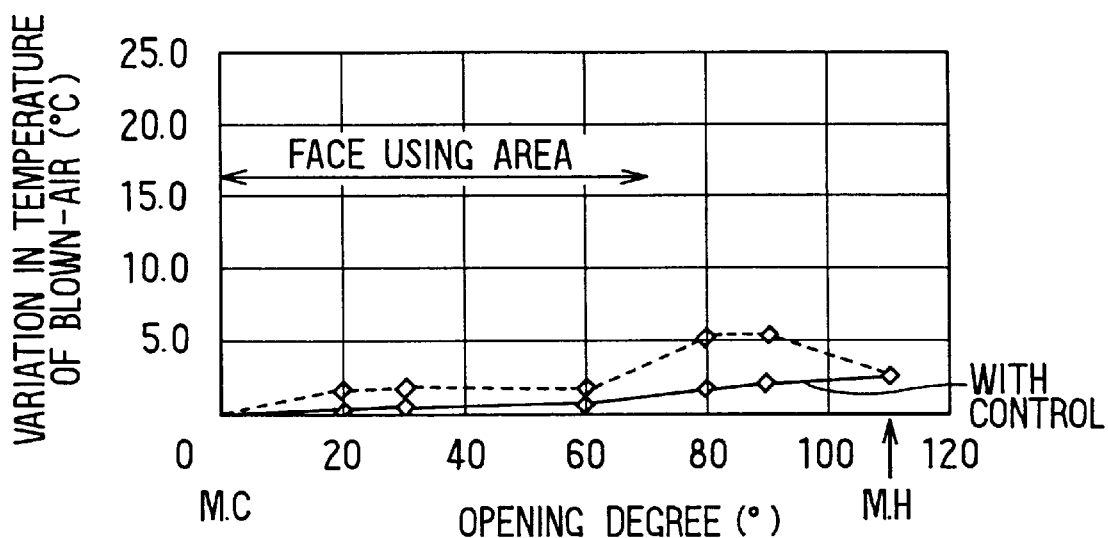
FIG. 5 is a graph showing the relationship between the opening degree of the flow control valve and the variation in the temperature of blown-air during a face mode, according to the first embodiment.
Figure 6:
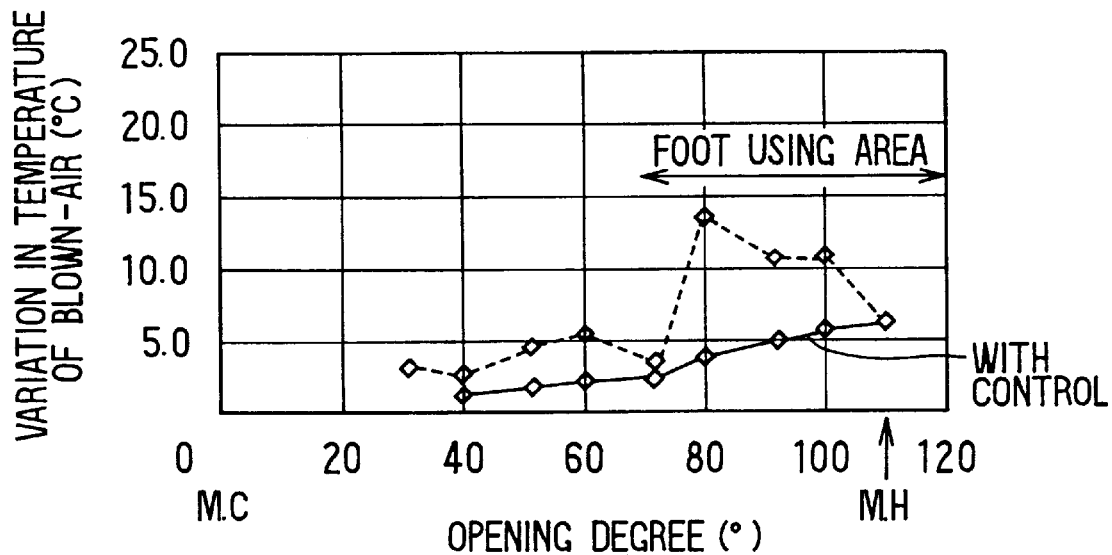
FIG. 6 is a graph showing the relationship between the opening degree of the flow control valve and the variation in the temperature of blown-air during a foot mode, according to the first embodiment.

FIGS. 5, 6 show the relationship between the opening degree of the valve body 16b of the flow control valve 16 and the variation in temperature of air blown from the heater core 17. In FIGS. 5, 6, the flow control valve 16 is set in such a manner that the opening degree (rotation angle) of the valve body 16b becomes maximum when opening degree of the valve body 16b is 110°. That is, when the opening degree of the valve body 16b of the flow control valve 16 is 110°, the maximum heating is set. FIG. 3 shows the variation in temperature of air blown from the heater core 17 due to the variation in engine rotation speed when the opening degree of the valve body 16b is 30°. Further, FIG. 4 shows the variation in temperature of air blown from the heater core 17 due to the variation in engine rotation speed when the opening degree of the valve body 16b is 80°. In FIGS. 3, 4, Tw1 indicates the temperature of hot water on an inlet of the heater core 17, Tw2 indicates the temperature of hot water on an outlet of the heater core 17, Ta1 indicates the temperature of air before sucking into the heater core 17, and Ta2 indicates the temperature of air immediately after being blown out from the heater core 17. Further, the shutting pressure in FIGS. 3, 4 is a pressure difference between the pressure of hot water on the inlet of the heater core 17 and the pressure of hot water on the outlet of the heater core 17 when the flow of the hot water flowing into the heater core 17 is shut off. The shutting pressure is increased, as the rotation speed of the engine 12 increases.

Because the heater core 17 of the rear air-conditioning unit 15 is coupled to the engine 12 by a long hot water pipe, the water-flow resistance is greatly decreased when hot water is supplied from the engine to the heater core 17 of the rear air-conditioning unit 15, as compared with a case in the heater core 11 of the front air-conditioning unit 10. Therefore, when the rotation speed of the engine 12 is changed from 650 rpm of the engine-idling to 6000 rpm, the shutting pressure in the heater core 11 of the front air-conditioning unit 10 is changed in a range of 5–150 KPa, but the shutting pressure in the heater core 17 of the rear air-conditioning unit 15 is changed in a range of 1–72 KPa. Specifically, during the engine-idling, the shutting pressure in the heater core 17 of the rear air-conditioning unit 15 is greatly decreased.

As shown in FIG. 3, when the opening degree of the valve body 16b of the flow control valve 16 is 30°, the temperature of air blown from the heater core 17 is changed in a range of 15° C.–17.5° C. relative to the change of the engine rotation speed in the range of 650 rpm–6000 rpm. In this case, the temperature of air blown from the heater core 17 is changed by a temperature difference of 2.5° C. When the valve body 16b is operated with a small opening degree of 30°, the pressure difference between both sides of the pressure-response valve 16f is increased, and the amount of hot water bypassing the heater core 17 through the pressure-response valve 16f is increased. Therefore, the variation in the flow amount of hot water flowing into the heater core 17 due to the variation in the engine rotation speed can be effectively absorbed by adjusting the amount of hot water flowing through the pressure-response valve 16f.

On the other hand, as shown in FIG. 4, when the opening degree of the valve body 16b is 80°, the temperature of air blown from the heater core 17 is changed in a range of 50° C.–65° C. relative to the change of the engine rotation speed in the range of 650 rpm–6000 rpm. In this case, the temperature difference of air blown from the heater core 17 is increased to 15° C. That is, even when the opening degree of the valve body 16b is set to be equal, the temperature of air blown from the heater core 17 can be changed by 15° C. When the valve body 16b is operated with a large opening degree of 80°, the pressure difference between both sides of the pressure-response valve 16f is decreased, and the amount of hot water bypassing the heater core 17 through the pressure-response valve 16f is decreased. Thus, in this case, only a small amount of hot water can be adjusted by the pressure-response valve 16f, and the variation in the amount of hot water flowing into the heater core 17 due to the variation in the engine rotation speed cannot be sufficiently absorbed by the pressure-response valve 16f. Specifically, in the engine-idling, the shutting pressure of hot water in the heater core 17 is greatly decreased, the amount of hot water flowing into the heater core 17 is greatly reduced, and the temperature of air blown from the heater core is greatly decreased.

On the other hand, when the coil spring 16g of the pressure-response valve 16f is set to have a small spring constant to increase the absorption effect of the variation in the hot water amount due to the variation in the engine rotation speed, the pressure-response valve 16f is opened in a low pressure difference such as in the engine idling, and maximum heating capacity is greatly decreased.

In FIGS. 5, 6, the chain line indicates the variation in the temperature of air blown from the heater core 17 when the opening degree of the valve body 16b is changed between 0° (Maximum Cooling) and 110° (Maximum Heating) without the control of the present invention, and the solid line indicates the variation in the temperature of air blown from the heater core 17 when the opening degree of the valve body 16b is changed between 0° (Maximum Cooling) and 110° (Maximum Heating) when the control of the present invention is performed.

As shown in FIG. 5, during the face mode, the maximum is variation in the temperature of air blown from the heater core 17 is 5° C. even when the control of the present invention is not performed. Further, because the temperature of air blown into the passenger compartment is low during the face mode, the opening degree of the flow control valve 16 is generally set to be lower-than 75° When the opening degree of the flow control valve 16 is set to be lower than 75° during the face mode, the temperature of air blown from the heater core 17 is changed in a range of 2.5° C. even when the control of the present invention is not performed.

However, when the control of the present invention is not performed during the foot mode as shown by the chain line in FIG. 6, the variation in the temperature of air blown from the heater core 17 is quickly increased when the opening degree of the valve body 16b is equal to or larger than 70° Specifically, when the opening degree of the valve body 16b is around 80°, the variation in the temperature of blown-air becomes maximum (e.g., 14° C.). When the opening degree of the valve body 16b is larger than 80°, the temperature of air blown from the heater core 17 is not increased as the amount of hot water flowing into the heater core 17 increases, from the heat radiation characteristics of the heater core 17. Therefore, in this case, the variation in the temperature of air blown from the heater core 17 is gradually decreased.

Thus, in the first embodiment of the present invention, when the opening degree of the valve body 16b is larger than a predetermined degree during the foot mode, the opening degree of the valve body 16b is corrected so that the variation in the temperature of air blown from the heater core 17 due to the engine rotation speed is restricted.

Figure 7:
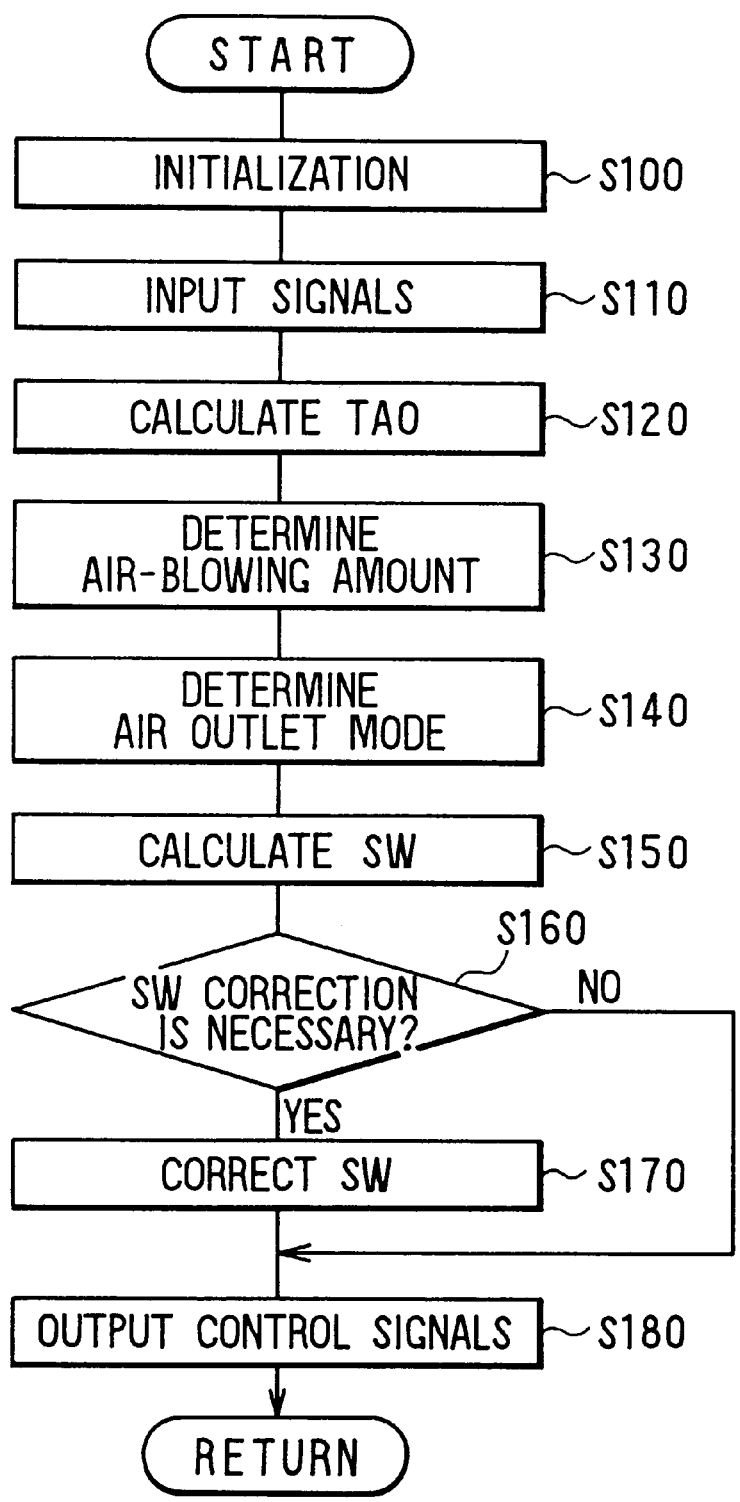
FIG. 7 is a flow diagram showing a control program of a control unit of the air conditioning apparatus according to first embodiment.
Figure 8:
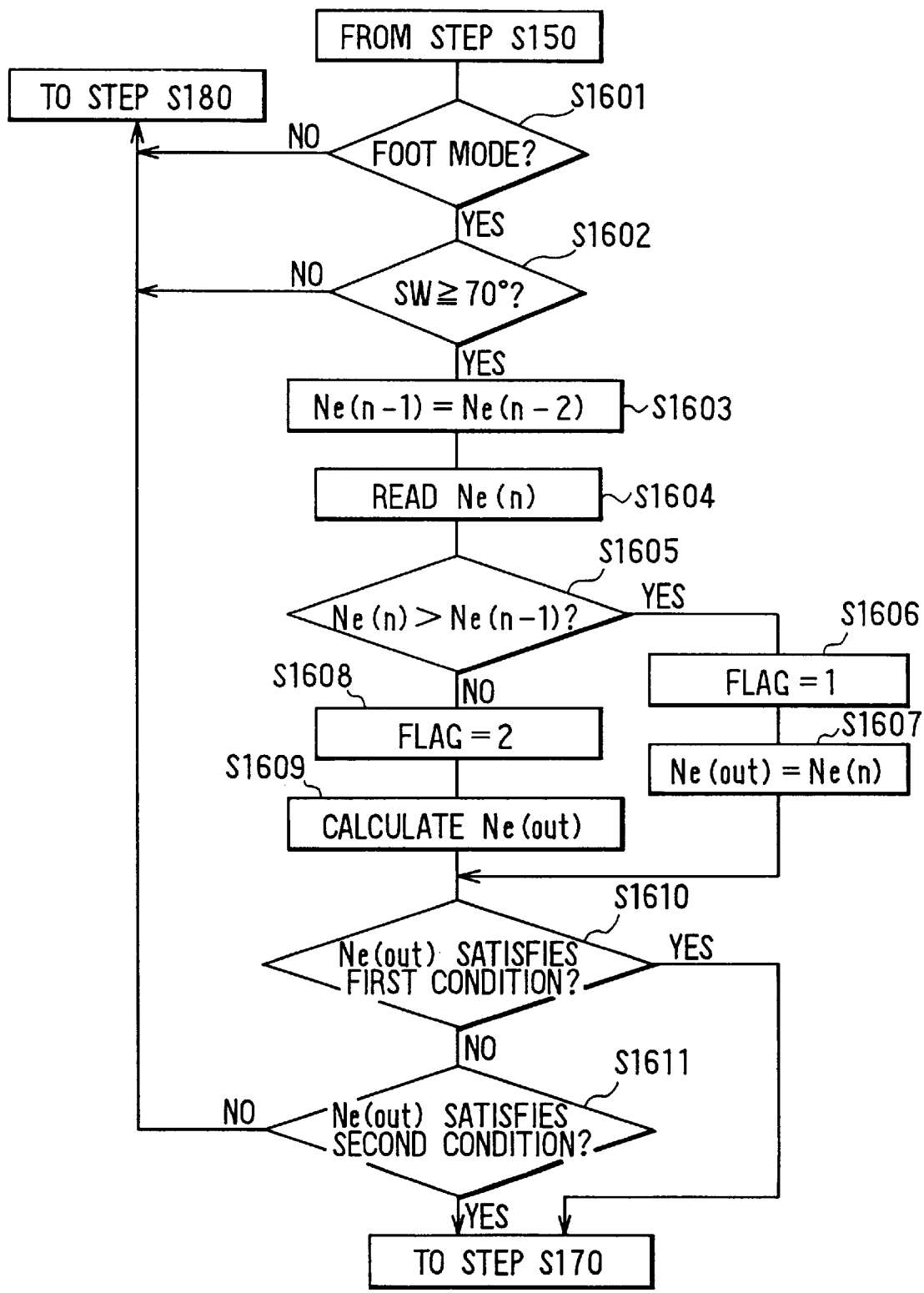
FIG. 8 is a flow diagram showing in detain a part of control in FIG. 7.
Figure 9:
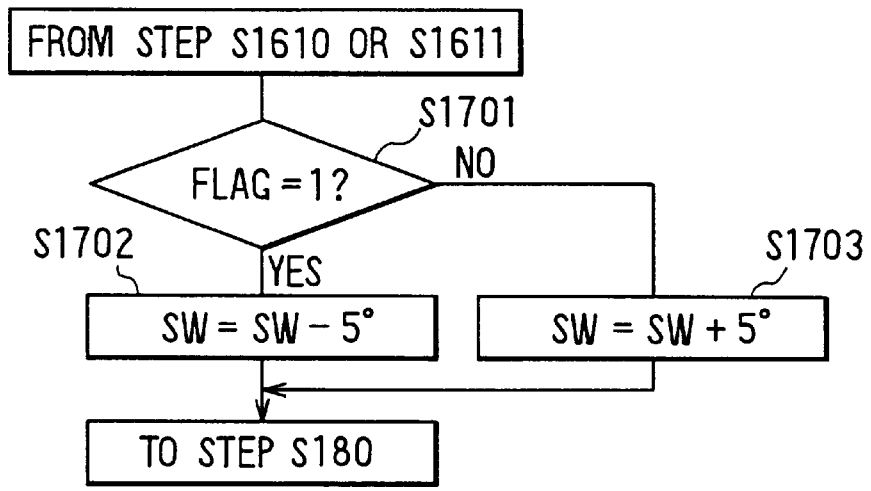
FIG. 9 is a flow diagram showing in detain a part of control in FIG. 8.

Next, the control of the flow control valve 16 will be now described with-reference to FIGS. 7–9. After an ignition switch of the engine 12 is turned on and electrical power is supplied to the control unit 35 (ECU), when the air amount setting unit 39 on the rear control panel 36 is set to an automatic position, the control routine shown in FIG. 7 starts.

Firstly, at step S100, an initialization such as a flag and a timer is performed. Next, at step S110, the temperature Tset set by the temperature setting unit 37 of the rear control panel 36 and each detected signal (e.g., Ne, Tr, Tam, Ts, Tw, Te) detected by the sensor group 40–45 are input into the control unit 35. At step S120, a target temperature TAO of air blown into the passenger compartment is calculated based on the following formula (1).

$$TAO = Kset \times Tset 31 \ Kr \times Tr - Kam \times Tam - Ks \times Ts + C \qquad (1)$$

Here, Kset, Kr, Kam and Ks are gains, and C is a correction constant. The target temperature TAO is an air temperature for maintaining the temperature of the passenger compartment at the set temperature Tset.

Next, at step S130, the air amount blown by the centrifugal fan 20 is determined based on the calculated target temperature TAO. That is, when the TAO is in a high temperature area (maximum heating side) or a low temperature area (maximum cooling side), the air amount blown from the centrifugal fan 20 is made larger. On the other hand, when the TAO is in a middle temperature area, the amount of air blown from the centrifugal fan 20 is made smaller. Further, at step S140, an air outlet mode is determined in accordance with the calculated TAO. That is, as the TAO increases from a low temperature to a high temperature, the face mode, the bi-level mode and the foot mode are selected in this order.

Next, at step S150, a target opening degree SW of the flow control valve 16 is calculated based on the following formula (2).

$$SW = [(TAO - Te)/(Tw - Te)] \times 110(°) \qquad (2)$$

Because the opening degree of the flow control valve 16 is 110° in the fully opened position, the opening degree calculated in the formula (2) is indicated by a rotation angle (°).

Next, at step S160, it is determined whether or not a correction of the target opening degree Sw calculated at step S150 is necessary. The determination at step S160 is performed in detail by steps S1601–S1611 in FIG. 8. That is, as shown in FIG. 8, it is determined whether or not the air outlet mode is the foot mode at step S1601. When the air outlet mode is not the foot mode at step S1601, the correction of the target opening degree SW is not necessary, and step S180 in FIG. 7 is performed. On the other hand, when the air outlet mode is the foot mode, it is determined whether or not the target opening degree SW is equal to or larger than a predetermined degree (e.g., 70°) at step S1602. When the target opening degree SW is smaller than the predetermined degree, step S180 in FIG. 7 is performed.

When the target opening degree SW is equal to or larger than the predetermined degree (e.g., 70°) at step S1602, the engine rotation speed Ne (n−1) before one time (n-1) of the present time (n), detected at regular intervals (e.g., at 4-second intervals), is changed to the preceding engine rotation speed Ne (n-2) at step S1603, and the present engine rotation speed Ne(n) is input at step S1604. By setting the Ne(n-2) to zero in the initialization at step S100, Ne(n-2) becomes zero (i.e., Ne(n-2) =0). Next, at step S1605, it is determined whether or not the present engine rotation speed Ne(n) is larger than the preceding engine rotation speed Ne(n-1). When the present engine rotation speed Ne(n) is larger than the preceding engine rotation speed Ne (n-1) at step S1605, that is, when the present engine rotation speed is increased as compared with the preceding engine rotation speed, flag is set to 1 (i.e., FLAG =1) at step S1606. Further, at step S1607, an output engine rotation speed Ne(out) is set to the present engine rotation speed Ne(n) (i.e., Ne(out) =N(n)).

On the other hand, when the present engine rotation speed Ne(n) is not larger than the preceding engine rotation speed Ne (n-1) at step S1605, that is, when the present engine rotation speed is decreased as compared with the preceding engine rotation speed, the flag is set to 2 (i.e., FLAG =2) at step S1608. Further, at step S1609, an output engine rotation speed Ne(out) is calculated by the following formula (3).

Ne(out)=[Ne(n-1)+Ne(n-2)+Ne(n-3)+Ne(n)]/4

That is, the output engine rotation speed Ne(out) is calculated by the average of 4 times.

Next, at step S1610, it is determined whether or not the output engine rotation speed Ne(out) satisfies a first condition. That is, in the first condition, the Ne(out) is larger than a first predetermined speed (e.g., Ne(out)>1000 rpm) while Ne(n-1) is smaller than the first predetermined rotation speed (i.e., Ne(n-1)<1000 rpm), or the Ne(out) is smaller than the first predetermined speed (e.g., Ne(out)<1000 rpm) while Ne(n-1) is larger than the first predetermined rotation speed (i.e., Ne(n-1)>1000 rpm). In the first embodiment, the first predetermined speed is about the engine-idling rotational speed.

When the output engine rotation speed Ne(out) does not satisfy the first condition at step S1610, it is determined whether or not the output engine rotation speed Ne(out) satisfies a second condition. That is, in the second condition, the Ne(out) is larger than a second predetermined speed (e.g., Ne(out)>2500 rpm) greatly larger than the first predetermined speed while Ne(n-1) is smaller than the second predetermined rotation speed (i.e., Ne(n-1)<2500 rpm), or the Ne(out) is smaller than the second predetermined speed (e.g., Ne(out)<2500 rpm) while Ne(n-1) is larger than the second predetermined rotation speed (i.e., Ne(n-1)>2500 rpm). For example, the second predetermined speed is a middle rotation speed of the engine 12 between the engine-idling rotation speed and the maximum rotation speed of the engine 12. When the output engine rotation speed Ne(out) satisfies the second condition at step S1611, next step S170 is performed. On the other hand, when the output engine rotation speed Ne(out) does not satisfy both the first condition and the second condition, it is determined that the target opening degree SW is not necessary to be corrected, and the operation of step S180 is performed.

When the output engine rotation speed Ne(out) satisfies any one of the first condition and the second condition, the target opening degree SW is corrected at step S170. The correction of the target opening degree SW at step S170 will be now described in detail as shown in FIG. 9. Firstly, at step S1701, it is determined whether or not the flag is equal to 1. When it is determined that the flag is equal to 1 so that the rotation speed of the engine 12 is increased to be larger than the first predetermined rotation speed or the second predetermined rotation speed, the target opening degree SW is corrected to (SW−5°) at step S1702 (i.e., SW=SW−5°). On the other hand, when the flag is not equal to 1, that is, when the flag is equal to 2 so that the rotation speed of the engine 12 is decreased to be smaller than the first predetermined rotation speed or the second predetermined rotation speed, the target opening degree SW is corrected to (SW+5°) at step S1703 (i.e., SW=SW+5°). The correction at step S1702 or step S1703 is performed, until it is determined that the next opening degree correction is necessary at step S1610 or step S1611.

Next, at step S180 in FIG. 7, control signals for controlling each actuator such as the blower motor 21 and the electrical driving units 30, 33 are output, so that the operation state determined at steps S130, S140, S150 and S170 can be obtained.

Figure 10:
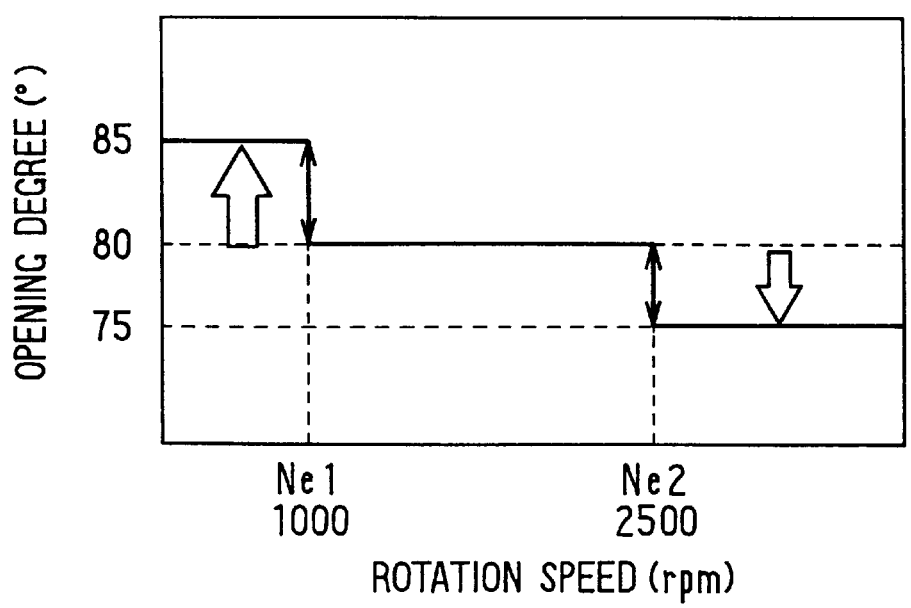
FIG. 10 is a view for explaining a control of an opening degree correction of the flow control valve according to the first embodiment.

FIG. 10 is a view for explaining the correction of the target opening degree SW of the first embodiment. For example, when the target opening degree SW is equal to 80° during the foot mode, the target opening degree SW is corrected to (80°+5°) when the engine rotation speed is lower than the first predetermined speed Ne1 (e.g., 1000 rpm), and the target opening degree SW is reset to (80°) when the engine rotation speed is increased to be larger than the first predetermined speed Ne1. On the other hand, when the target opening degree SW is equal to 80° during the foot mode, the target opening degree SW is corrected to (80°−5°) when the engine rotation speed is larger than the second predetermined speed Ne2 (e.g., 2500 rpm), and the target opening degree SW is reset to (80°) when the engine rotation speed is decreased to be smaller than the second predetermined speed Ne2.

Figure 11:
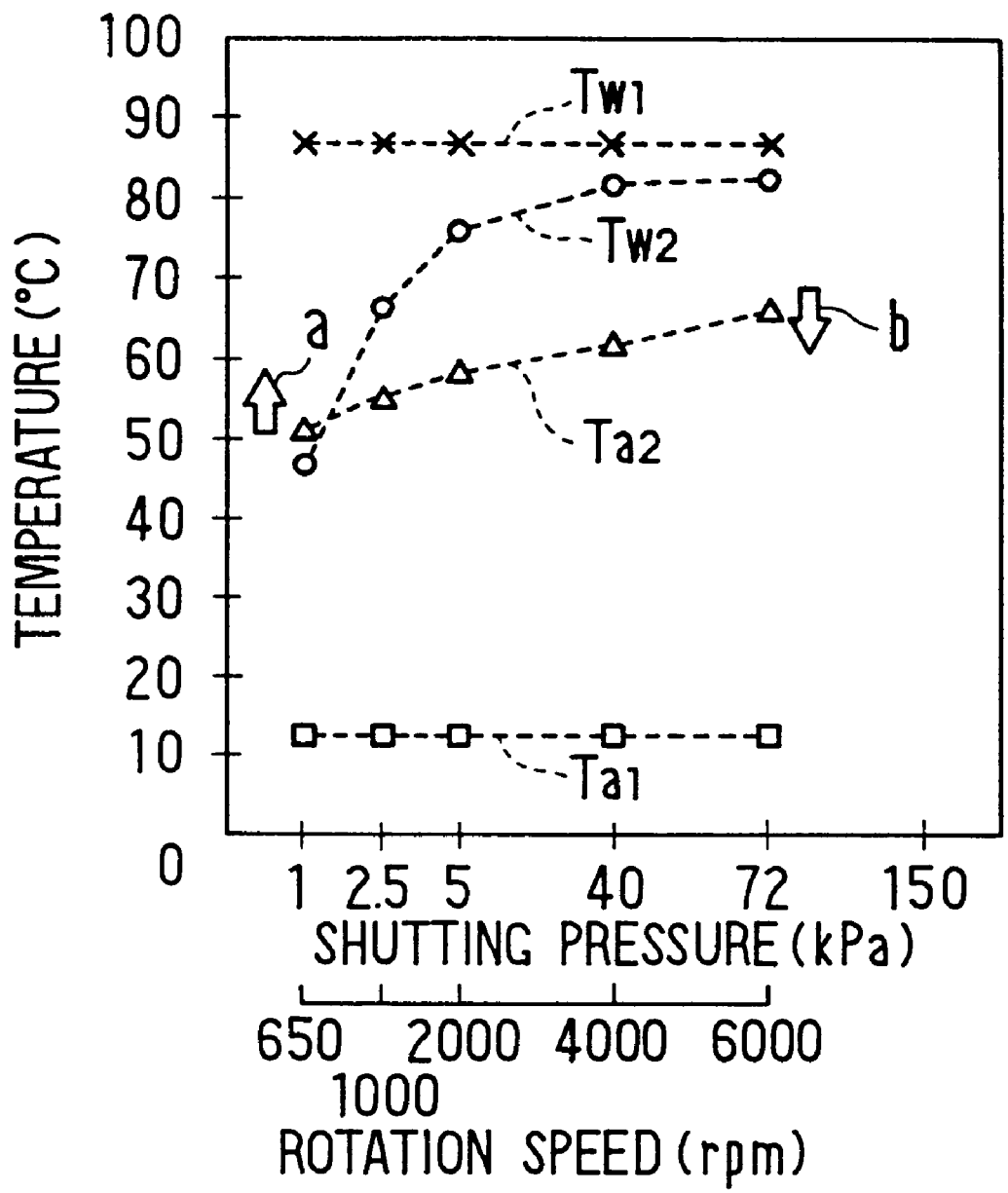
FIG. 11 is a graph for explaining the effect of the opening degree correction of the flow control valve when the opening degree of the flow control valve is 80°, according to the first embodiment.

As a result, during the engine-idling, the amount of hot water flowing into the heater core 17 can be increased by increasing the target opening degree SW, and the temperature of air blown from the heater core 17 can be increased as shown by arrow "a" in FIG. 11. Conversely, when the engine rotation speed is higher than 2500 rpm, the amount of hot water flowing into the heater core 17 can be decreased by decreasing the target rotation speed SW, and the temperature of air blown from the heater core 17 can be decreased as shown by arrow "b" in FIG. 11. Thus, when the correction of the target opening degree SW is performed during the foot mode, the variation in the temperature of blown-air due to the variation in the engine rotation speed can be approximately restricted to 6° C., as shown by the solid line in FIG. 6.

In the above-described control of the flow control valve 16, the correction of the target opening degree SW is performed only when the target opening degree SW of the flow control valve 16 is equal to or more than 70°. However, the correction of the target opening degree SW may be performed, even when the target opening degree SW is smaller than 70° For example, the solid line in FIG. 6 indicates a case where the correction of the target opening degree SW is performed when the target opening degree SW is in a range of 40°–110°. Because the variation in temperature of blown-air due to the variation in the engine rotation speed is small when the target opening degree SW is smaller than 70°, the correction amount of the target opening degree is set to the half value (±2.50°) as compared with the case where the target opening degree SW is equal to or larger than 70°.

When the amount of hot water flowing into the heater core 17 is decreased with the decrease of the engine rotation speed, the temperature of air blown from the heater core 17 is not decreased immediately from heat-radiating characteristics of the heater core 17. Therefore, in the first embodiment, as described at step S1609 in FIG. 8, when the engine rotation speed is decreased (i.e., flag=2), the output engine rotation speed Ne(out) is calculated by the time mean value in the above-described formula (3). Therefore, the correction of the target opening degree SW is not performed when the engine rotation speed is temporarily decreased. As a result, frequent operation of the electrical driving unit 33 of the valve body 16b of the flow control valve 16 can be prevented, and durability of the electrical driving unit 33 can be improved.

On the other hand, when the engine rotation speed increases, the temperature of air blown from the heater core 17 is increased with the increase of the amount of hot water flowing into the heater core 17. Therefore, as described at step S1607 in FIG. 8, the output engine rotation speed Ne(out) is set to the present engine rotation speed Ne(n). Thus, the correction of the target opening degree SW can be immediately performed in accordance with the increase of the engine rotation speed.

Figure 12:
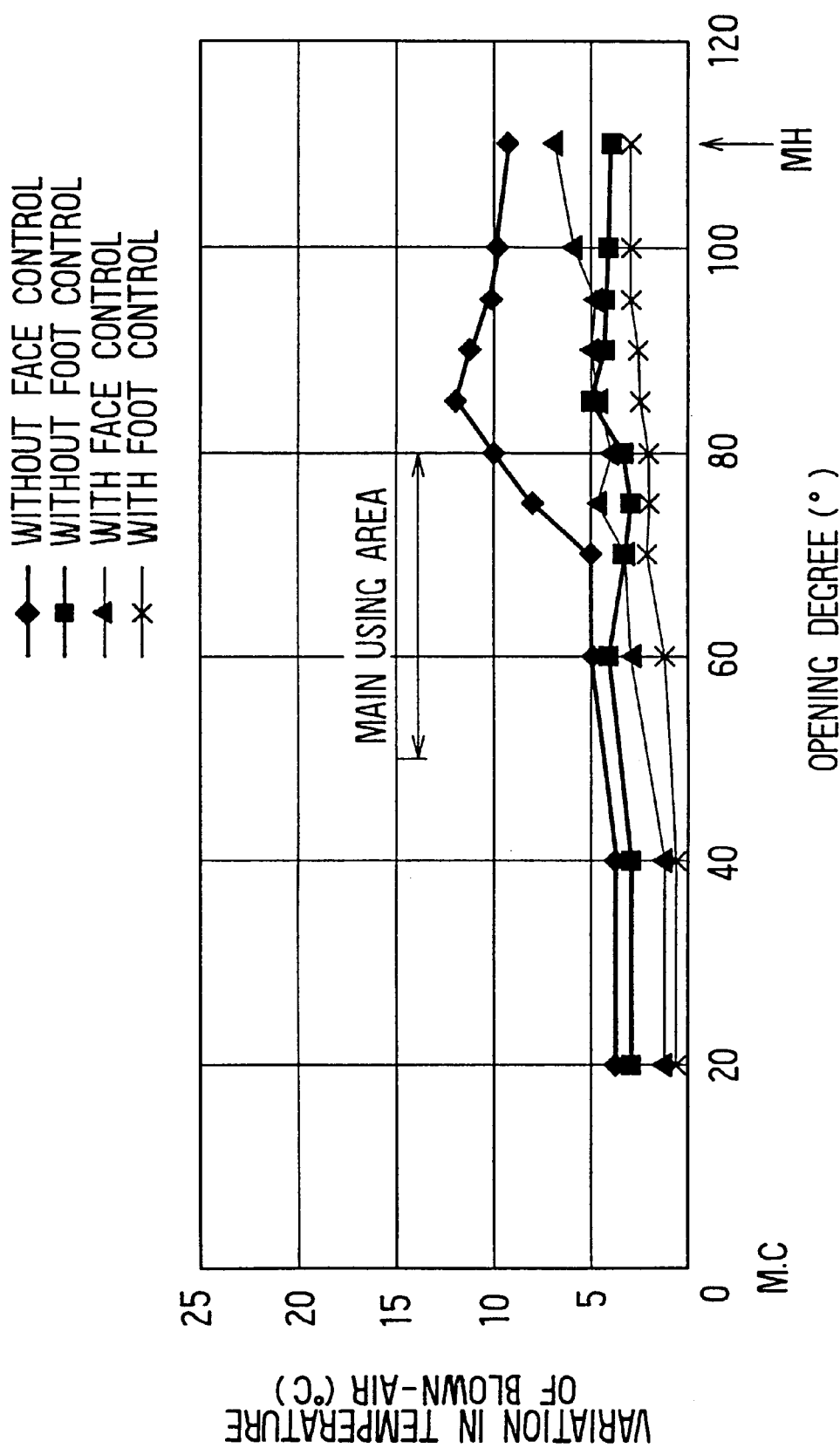
FIG. 12 is a graph showing the relationship between the opening degree of the flow control valve and the variation in the temperature of blown-air during a bi-level mode, according to the first embodiment.

In the above-described control of the flow control valve 16, the correction of the target opening degree SW is performed during the foot mode. However, the target opening degree SW may be corrected during the face mode, as shown by the solid line in FIG. 5. Further, the target opening degree SW may be corrected during the bi-level mode, as shown in FIG. 12. During the bi-level mode, by performing the correction control of the target opening degree SW, both variations in the temperature of air blown from the face air outlet and in the temperature of air blown from the foot air outlet can be decreased.

During the face mode shown in FIG. 6 or the bi-level mode shown in FIG. 12, the correction amount of the target opening degree SW is set to ±5° when the target opening degree of the flow control valve 16 is equal to or larger than 70°, and the correction amount of the target opening degree SW is set to ±2.5 when the target opening degree of the flow control valve 16 is smaller than 70°

A second preferred embodiment of the present invention will be now described with reference to FIG. 13. In the above-described first embodiment, the target opening degree SW of the flow control valve 16 is calculated by the formula (2) based on the calculated target air temperature TAO, and the temperature of air blown into the passenger compartment is automatically controlled. However, in the second embodiment of the present invention, the target opening degree SW of the flow control valve 16 can be directly determined based on manual operation of a passenger in the passenger compartment. That is, in the second embodiment, the present invention is applied to a vehicle in which the temperature of air blown into the passenger compartment is manually controlled.

Figure 13:
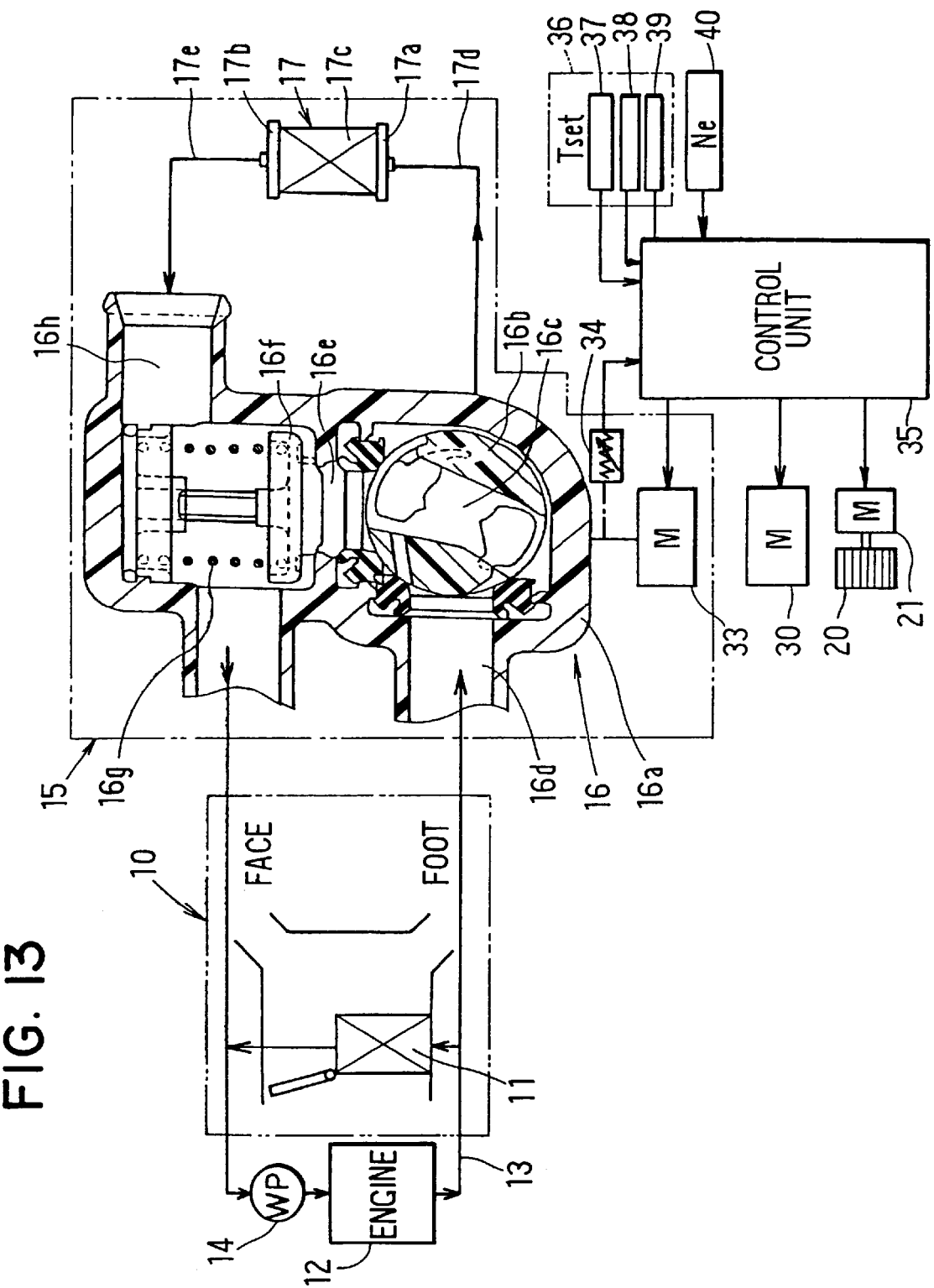
FIG. 13 is a schematic view showing an entire construction of a vehicle air conditioning apparatus according to a second preferred embodiment of the present invention.

That is, in the second embodiment, the target opening degree SW is directly determined based on an electrical signal (e.g., electrical resistance) of the temperature setting unit 37 of the rear operation panel, while the sensor group 41–45 of the first embodiment is omitted as shown in FIG. 13. Here, the control unit 35 controls the electrical driving unit 33 so that the opening degree detected by the opening degree sensor 34 becomes to be equal to the target opening degree SW determined by the temperature setting unit 37. Further, the air outlet mode and the air-blowing amount are respectively determined by manual operation positions of the setting units 38, 39, respectively.

Even in the manual operation of the rear air-conditioning unit 15, the variation in temperature of air blown from the heater core 17 due to the variation in the engine rotation speed can be decreased by performing the correction of the target opening degree SW based on the detected signal from the engine rotation speed sensor 40 in the control unit 35.

Although the present invention has been fully described in connection with the preferred embodiments thereof with reference to the accompanying drawings, it is to be noted that various changes and modifications will become apparent to those skilled in the art.

For example, in the above-described first and second embodiments of the present invention, the opening degree is correction of the flow control valve 16 for adjusting the amount of hot water flowing into the heater core 17 of the rear air-conditioning unit 15 is described. However, when the temperature of air blown into the passenger compartment is controlled by adjusting a flow amount of hot water flowing into a front heater core of the front air-conditioning unit 10, the present invention may be applied to the front air-conditioning unit 10.

Further, in the above-described first and second embodiments, air passing through the heater core 17 is heated by using hot water for cooling the engine as a heating source. However, a fluid for cooling a driving unit for driving the vehicle and the like may be used as the heating source for heating air. In this case, the target opening degree of the flow control valve 16 may be corrected in accordance with an operation state of the driving unit so that the variation in the amount of fluid flowing into the heat core 17 due to variation in the operation state of the driving unit can be restricted.

Such changes and modifications are to be understood as being within the scope of the present invention as defined by the appended claims.

What is claimed is:

1. An air conditioning apparatus for a vehicle having an engine, said air conditioning apparatus comprising:

a water circuit through which water heated by the engine circulates;

a water pump driven by the engine, said water pump being disposed in said water circuit to circulate water in said water circuit;

a heating heat exchanger, disposed in said water circuit, for heating air by performing heat exchange between water in said water circuit and air passing therethrough;

a flow control valve which adjusts a flow amount of water flowing into said heating heat exchanger to adjust temperature of air blown from said heating heat exchanger, said flow control valve including a water bypass passage through which water bypasses said heating heat exchanger, and a pressure-response valve for adjusting an opening degree of said water bypass passage in accordance with pressure of water supplied from the engine by said water pump; and a control unit for controlling an opening degree of said flow control valve to become a target opening degree so that the flow amount of water flowing into said heating heat exchanger is controlled, wherein said control unit corrects the target opening degree of said flow control valve in a direction for reducing variation in the flow amount of hot water flowing into said heating heat exchanger due to variation in a rotation speed of the engine;

said control unit includes correction determining means for determining whether or not a correction of the opening degree of said flow control valve is necessary; and said control unit performs the correction of the target opening degree of said flow control valve based on the mean rotation speed of the engine relative to a predetermined time, when the rotation speed of the engine decreases when the correction determining means determines that the correction of the opening degree of said flow control valve is necessary.

2. The air conditioning apparatus according to claim 1, wherein:

said control unit immediately performs the correction of the target opening degree of said flow control valve, when the rotation speed of the engine increases when the correction determining-means determines that the correction of the opening degree of said flow control valve is necessary.

* * * * *